(12) United States Patent
Lim et al.

(10) Patent No.: US 9,648,340 B2
(45) Date of Patent: May 9, 2017

(54) METHOD AND DEVICE FOR ENCODING/DECODING MOTION VECTOR

(71) Applicant: SK TELECOM CO., LTD., Seoul (KR)

(72) Inventors: Jeongyeon Lim, Seongnam-si (KR); Joohee Moon, Seoul (KR); Yunglyul Lee, Seoul (KR); Haekwang Kim, Seoul (KR); Byeungwoo Jeon, Seongnam-si (KR); Jongki Han, Seoul (KR); Juock Lee, Seoul (KR); Hyoungmee Park, Suwon-si (KR)

(73) Assignee: SK TELECOM CO., LTD., Seoul (KR)

( * ) Notice: Subject to any disclaimer, the term of this patent is extended or adjusted under 35 U.S.C. 154(b) by 796 days.

(21) Appl. No.: 13/942,081

(22) Filed: Jul. 15, 2013

(65) Prior Publication Data

US 2013/0294518 A1 Nov. 7, 2013
US 2016/0309144 A9 Oct. 20, 2016

Related U.S. Application Data

(63) Continuation of application No. PCT/KR2012/000361, filed on Jan. 16, 2012.

(30) Foreign Application Priority Data

Jan. 15, 2011 (KR) .................. 10-2011-0004298
Jan. 17, 2011 (KR) .................. 10-2011-0004388

(51) Int. Cl.
*H04N 7/26* (2006.01)
*H04N 7/12* (2006.01)
(Continued)

(52) U.S. Cl.
CPC .......... *H04N 19/513* (2014.11); *H04N 19/46* (2014.11); *H04N 19/52* (2014.11); *H04N 19/523* (2014.11); *H04N 19/91* (2014.11)

(58) Field of Classification Search
CPC .. H04N 19/00696; H04N 19/52; H04N 19/46; H04N 19/523; H04N 19/91
(Continued)

(56) References Cited

U.S. PATENT DOCUMENTS 7,499,495 B2 * 3/2009 Srinivasan ........... H04N 19/513
348/416.1
2003/0156646 A1 * 8/2003 Hsu ....................... H04N 19/136
375/240.16
(Continued)

FOREIGN PATENT DOCUMENTS

KR    1020040068854    8/2004
KR    1020100001078    1/2010
KR    1020100086864    8/2010

OTHER PUBLICATIONS

International Search Report mailed Sep. 12, 2012 for PCT/KR2012/000361.

*Primary Examiner* — Hee-Yong Kim
(74) *Attorney, Agent, or Firm* — Hauptman Ham, LLP

(57) ABSTRACT

A method performed by a motion vector encoding apparatus for encoding a motion vector includes: determining a first motion vector and a second motion vector relating to a current block to be encoded; determining predicted motion vectors of the first motion vector and the second motion vector, respectively; calculating a first differential motion vector and a second differential motion vector; the first differential motion vector corresponding to a difference between the first motion vector and the predicted motion vector of the first motion vector, the second differential motion vector corresponding to a difference between the (Continued)

second motion vector and the predicted motion vector of the second motion vector; and encoding the first differential motion vector and the second differential motion vector, wherein the first motion vector and the second motion vector have different resolutions.

6 Claims, 9 Drawing Sheets

(51) Int. Cl.
*H04B 1/66* (2006.01)
*H04N 19/513* (2014.01)
*H04N 19/52* (2014.01)
*H04N 19/46* (2014.01)
*H04N 19/523* (2014.01)
*H04N 19/91* (2014.01)

(58) Field of Classification Search
USPC .................................................. 375/240.16
See application file for complete search history.

(56) References Cited

U.S. PATENT DOCUMENTS

| 2005/0053141 | A1* | 3/2005 | Holcomb | H04N 19/70 |
| | | | | 375/240.16 |
| 2008/0247462 | A1* | 10/2008 | Demos | H04N 19/597 |
| | | | | 375/240.03 |
| 2009/0034619 | A1* | 2/2009 | Mukherjee | H04N 19/105 |
| | | | | 375/240.16 |

* cited by examiner

| Exemplary Combined Resolutions | Unidirectional Simple Prediction Mode | | Unidirectional Complex Prediction Mode/Bidirectional Prediction Mode | | | |
| --- | --- | --- | --- | --- | --- | --- |
| | Motion Vector | | Motion Vector 1 | | Motion Vector 2 | |
| | Resolution | Flag Transmission (× Non Transmission/ ○ Transmission of Flag) | Resolution | Flag Transmission (× Non Transmission/ ○ Transmission of Flag) | Resolution | Flag Transmission (× Non Transmission/ ○ Transmission of Flag) |
| 1 | 1/4 | × | 1/4 | × | 1/4 or 1/8 | ○ |
| 2 | 1/4 | × | 1/4 or 1/8 | ○ | 1/4 or 1/8 | ○ |
| 3 | 1/4 | × | 1/4 or 1/8 | ○ | 1/4 | × |
| 4 | 1/4 | × | 1/4 or 1/8 (○ Transmit a Flag Common to Motion Vectors 1 and 2) | | | |
| 5 | 1/4 or 1/8 | ○ | 1/4 | × | 1/4 or 1/8 | ○ |
| 6 | 1/4 or 1/8 | ○ | 1/2 or 1/8 | ○ | 1/4 or 1/8 | ○ |
| 7 | 1/4 or 1/8 | ○ | 1/2 or 1/8 | ○ | 1/4 | × |
| 8 | 1/4 or 1/8 | ○ | 1/4 or 1/8 (○ Transmit a Flag Common to Motion Vectors 1 and 2) | | | |
| 9 | 1/4 | × | 1/4 or 1/8 | ○ | 1/4 (If Motion Vector 1 is 1/4) | × |
| | | | | | 1/4 or 1/8 (If Motion Vector 1 is 1/8) | ○ |

*FIG. 1*

| Exemplary Combined Resolutions | Unidirectional Simple Prediction Mode | | Unidirectional Complex Prediction Mode/Bidirectional Prediction Mode | | | |
|---|---|---|---|---|---|---|
| | Motion Vector | | Motion Vector 1 | | Motion Vector 2 | |
| | Resolution | Flag Transmission (× Non Transmission/ ○ Transmission of Flag) | Resolution | Flag Transmission (× Non Transmission/ ○ Transmission of Flag) | Resolution | Flag Transmission (× Non Transmission/ ○ Transmission of Flag) |
| 1 | 1/2 | × | 1/4 | × | 1/2 or 1/8 | ○ |
| 2 | 1/2 | × | 1/2 or 1/8 | ○ | 1/2 or 1/8 | ○ |
| 3 | 1/2 | × | 1/2 or 1/8 | ○ | 1/4 | × |
| 4 | 1/2 | × | 1/4 or 1/8 (○ Transmit a Flag Common to Motion Vectors 1 and 2) | | | |
| 5 | 1/2 or 1/4 | ○ | 1/4 | × | 1/2 or 1/8 | ○ |
| 6 | 1/2 or 1/4 | ○ | 1/2 or 1/8 | ○ | 1/2 or 1/8 | ○ |
| 7 | 1/2 or 1/4 | ○ | 1/2 or 1/8 | ○ | 1/4 | × |
| 8 | 1/2 or 1/4 | ○ | 1/4 or 1/8 (○ Transmit a Flag Common to Motion Vectors 1 and 2) | | | |
| 9 | 1/2 | × | 1/2 or 1/8 | ○ | 1/2 (If Motion Vector 1 is 1/2) | × |
| | | | | | 1/2 or 1/8 (If Motion Vector 1 is 1/8) | ○ |

*FIG. 2*

| Motion Vector Resolution | Prediction Mode | bin | |
|---|---|---|---|
| | | Bin 1 | Bin 2 |
| 1/4 | Unidirectional Simple Prediction Mode | 0 | - |
| 1/8 | Unidirectional Simple Prediction Mode | 1 | 0 |
| 1/8 | Unidirectional Complex Prediction Mode | 1 | 1 |

|  | Conditions |
|---|---|
| Context 0 | If Blocks A and B are both 1/4 |
| Context 1 | If Either Block A or Block B is 1/4 |
| Context 2 | If neither of the Blocks is 1/4 |

FIG. 5

|  | Conditions |
|---|---|
| Context 0 | If Blocks A and B are both a Unidirectional Complex Prediction Mode |
| Context 1 | If Either Block A or Block B is the Unidirectional Complex Prediction Mode |
| Context 2 | If neither of the Blocks is the Unidirectional Complex Prediction Mode |

FIG. 6

| Motion Vector Resolution | Prediction Mode | Bin | | |
|---|---|---|---|---|
| | | Bin 1 | Bin 2 | Bin 3 |
| 1/4 | Unidirectional Simple Prediction Mode | 0 | - | |
| 1/8 | Unidirectional Simple Prediction Mode | 1 | 0 | |
| 1/8 | Unidirectional Complex Prediction Mode | 1 | 1 | 0 |
| 1/8 | Bidirectional Prediction Mode | 1 | 1 | 1 |

*FIG. 7*

| | Conditions |
|---|---|
| Context 0 | If Blocks A and B are both a Bidirectional Prediction Mode |
| Context 1 | If Either Block A or Block B is the Bidirectional Prediction Mode |
| Context 2 | If neither of the Blocks is the Bidirectional Prediction Mode |

METHOD AND DEVICE FOR ENCODING/DECODING MOTION VECTOR

CROSS-REFERENCE TO RELATED APPLICATION

The present application is a continuation of International Patent Application No. PCT/KR2012/000361, filed Jan. 16, 2012, which is based on and claims priority to Korean Patent Application No. 10-2011-0004298, filed on Jan. 15, 2011 and Korean Patent Application No. 10-2011-0004388, filed on Jan. 17, 2011. The disclosures of the above-listed applications are hereby incorporated by reference herein in their entirety.

TECHNICAL FIELD

The present disclosure relates to a method and a device for encoding/decoding a motion vector in consideration of an adaptive motion vector resolution.

BACKGROUND

The statements in this section merely provide background information related to the present disclosure and may not constitute prior art.

Encoding of data for a video includes an intra prediction encoding and an inter prediction encoding. The intra prediction encoding and the inter prediction encoding corresponds to an effective method which can reduce the correlation between data and is widely used for compression of various data. Especially, in the inter prediction encoding, since a motion vector of a current block determined through estimation of the motion of the current block closely relates to motion vectors of neighboring (or adjacent) blocks, it is allowed to calculate a Predicted Motion Vector (PMV) for the motion vector of the current block from the motion vectors of the neighboring blocks and then encode a Differential Motion Vector (DMV) for the PMV without encoding the value of the motion vector of the current block itself, which can considerably reduce the quantity of bits to be encoded, so as to improve the encoding efficiency.

That is, in the case of performing an inter prediction encoding, an encoder encodes and transmits a differential vector which corresponds to a differential value between a current motion vector and a predicted motion vector determined through estimation of the motion of the current block from a reference frame reconstructed through previous encoding and decoding. Also, a decoder reconstructs a current motion vector by adding a predicted motion vector and a differential vector transmitted by predicting a motion vector of a current block by using a motion vector of previously decoded motion vectors of neighboring blocks.

Further, at the time of performing an inter prediction encoding, the resolution may be collectively raised by interpolating the reference frame, and the differential vector corresponding to a differential value between the current motion vector and the predicted motion vector determined through estimation of the motion of the current block may be then encoded and transmitted. In this event, an increase in the resolution of the reference frame enables a more exact inter prediction, thereby reducing the quantity of bits generated by the encoding of a residual signal between an original image and a predicted image. However, such an increase of the resolution of the reference frame may also increase the resolution of the motion vector, which increases the quantity of bits generated by the encoding of the differential vector. In contrast, a decrease in the resolution of the reference frame increases the quantity of bits generated by the encoding of a residual signal but decreases the resolution of the motion vector, which thereby decreases the quantity of bits generated by the encoding of the differential vector.

The inventor(s) has noted that in the inter prediction encoding according to the prior art, all blocks, slices, and pictures of an image, which correspond to encoding units of the image, are interpolated with the same resolution, and an inter prediction encoding is then performed using a motion vector of the same resolution for all of them. For example, in the case of H.264/AVC standard, the resolution of the motion vector is fixed to a ¼ resolution. The inventor(s) has experienced that an increase of the motion vector causes an increase of the residual signal to thereby degrade the compression efficiency.

Further, the inventor(s) has experienced that since the inter prediction decoding corresponds to the inter prediction encoding, the degradation of the compression efficiency in the inter prediction encoding makes it difficult to expect a high efficiency of the inter prediction decoding.

SUMMARY

In accordance with some embodiments of the present disclosure, a motion vector encoding apparatus is configured to determine a first motion vector and a second motion vector relating to a current block to be encoded, to determine a predicted motion vector of the first motion vector and a predicted motion vector of the second motion vector, to calculate a first differential motion vector and a second differential motion vector, and to encode the first differential motion vector and the second differential motion vector.

In accordance with some embodiments of the present disclosure, a motion vector decoding apparatus is configured to determine a first predicted motion vector and a second predicted motion vector relating to a current block to be decoded, to decode information on a motion vector resolution, to decode a first differential motion vector and a second differential motion vector by using the decoded information on the motion vector resolution, to reconstruct a first motion vector by adding the decoded first differential motion vector and the first predicted motion vector, and to reconstruct a second motion vector by adding the decoded second differential motion vector and the second predicted motion vector.

In accordance with some embodiments of the present disclosure, a motion vector encoding apparatus is configured to determine an inter prediction mode of a current block to be encoded, among prediction modes including a first prediction mode which uses a motion vector and a second prediction mode which uses a plurality of motion vectors, to determine each resolution of the one or more motion vectors of the current block, and to encode the one or more motion vectors based on the determined each resolution.

In accordance with some embodiments of the present disclosure, a motion vector decoding apparatus is configured to determine an inter prediction mode of a current block to be decoded, among prediction modes including a first prediction mode which uses a motion vector and a second prediction mode which uses a plurality of motion vectors, to determine each resolution of one or more motion vectors of the current block, and decoding the one or more motion vectors based on the determined each resolution.

BRIEF DESCRIPTION OF DRAWINGS

FIG. 1 is an exemplary diagram of implementations of different inter prediction modes combined with motion vector resolutions and transmission or non-transmission of the motion vector resolution flag according to at least one embodiment of the present disclosure.

FIG. 2 is an exemplary diagram of implementations of different inter prediction modes combined with motion vector resolutions and transmission or non-transmission of the motion vector resolution flag according to at least one embodiment of the present disclosure.

FIG. 5 is a diagram of a probability condition of bin 1.

FIG. 6 is a diagram of a probability condition of bin 2.

FIG. 7 is an exemplary diagram of methods of encoding/decoding motion vector resolutions and inter prediction modes for a B picture in a single syntax.

FIG. 8 is a diagram of a probability condition of bin 3.

DETAILED DESCRIPTION

Figures 3, 4:
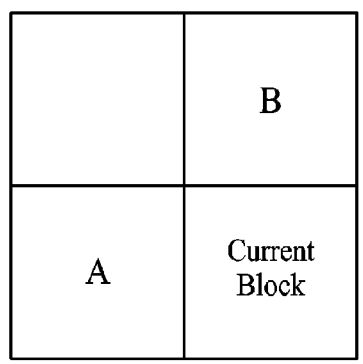
FIG. 3 is an exemplary diagram of methods of encoding/decoding motion vector resolutions and inter prediction modes for a P picture in a single syntax.
FIG. 4 is an exemplary diagram of relative positions of neighboring blocks A and B of a current block to be encoded/decoded according to at least one embodiment of the present disclosure.

The present disclosure improves an encoding efficiency of a motion vector, a compression efficiency of an image, and a quality of a reconstructed image by encoding the motion vector using an adaptive motion vector accuracy. The present disclosure reconstructs an encoded motion vector by using an adaptive motion vector accuracy. The present disclosure also efficiently encodes and decodes information indicating the accuracy of a motion vector in the case of using an adaptive motion vector accuracy.

Hereinafter, one embodiment of the present disclosure will be described in detail with reference to the accompanying drawings. In the following description, like reference numerals designate like elements although the elements are shown in different drawings. Further, in the following description of the one embodiment, a detailed description of known functions and configurations incorporated herein will be omitted for the purpose of clarity and for brevity.

Additionally, in describing the components of the present disclosure, terms like first, second, A, B, (a), and (b) are used. These are solely for the purpose of differentiating one component from another, and one of ordinary skill would understand the terms are not to imply or suggest the substances, order or sequence of the components. If a component is described as 'connected', 'coupled', or 'linked' to another component, one of ordinary skill in the art would understand the components are not necessarily directly 'connected', 'coupled', or 'linked' but also are indirectly 'connected', 'coupled', or 'linked' via a third component.

A video encoding apparatus and/or a video decoding apparatus according to one or more embodiments may correspond to a user terminal such as a PC (personal computer), notebook computer, PDA (personal digital assistant), PMP (portable multimedia player), PSP (PlayStation Portable), wireless communication terminal, smart phone, TV, and the like. A video encoding apparatus and/or a video decoding apparatus according to one or more embodiments may correspond to various apparatuses each including a communication apparatus such as a communication modem and the like for performing communication with various types of devices or a wired/wireless communication networks, a memory for storing various programs and data that encode or decode a video or perform an inter/intra-prediction for encoding or decoding, and a microprocessor to execute a program so as to perform calculation and controlling, and the like. The entropy coding is a scheme that encodes a given set of symbols with the minimum number of bits to represent them.

Hereinafter, motion vector encoding and decoding according to some embodiments of the present disclosure will be described.

One Embodiment

Now, an apparatus and a method for motion vector encoding/decoding according to One embodiment of the present disclosure will be described.

According to one or more embodiments of the present disclosure, a motion vector may have various resolutions. The motion vector according to the one embodiment of the present disclosure may have a ¼ resolution and a ⅛ resolution. When a motion vector encoding apparatus according to the one embodiment of the present disclosure need to notify a decoding apparatus of a resolution of a motion vector, the motion vector encoding apparatus may generate and transmit a motion vector resolution flag indicating a resolution of a motion vector of a current block.

In the one embodiment, the motion vector resolution flag indicates the resolution of the motion vector of the current block rather than a resolution of a differential motion vector or a predicted motion vector.

In the one embodiment, a plurality of motion vectors relating to the current block, i.e. a plurality of motion vectors for use in an inter prediction encoding of the current block, may be transmitted. Further, the motion vector resolution flag for each motion vector may be transmitted. Otherwise, the motion vector resolution flag may be transmitted in units of current blocks. For example, two motion vectors of (¾, ¼) and (−¼, ¼) wherein the resolution of the motion vector of the current block is ¼ may be transmitted. Respective motion compensation blocks are generated using the two motion vectors, and a predicted block of the current block is generated using an average of the two motion compensation blocks. In this event, the weighted average of the two motion compensation blocks may be calculated.

When a plurality of motion vectors used for the inter prediction of the current block are transmitted, the encoder encodes information indicating that it is a mode in which a plurality of motion vectors are transmitted. Therefore, when the mode of the current block is a mode in which a plurality of motion vectors exists, the decoder decodes the plurality of motion vectors.

In the one embodiment, it is possible to generate a block having a different resolution by using a plurality of motion vectors. For example, when two motion vectors are used for the inter prediction of the current block and are (0, ¼) and (¼, 1), respectively, it is possible to generate a motion compensation block at the position of (⅛, ⅝) by generating respective motion compensation blocks by using the two motion vectors and then bi-linearly interpolating the two motion compensation blocks. Therefore, the encoder may perform encoding using two motion vectors having calculable locations, without encoding a motion vector using the resolutions in units of ⅛ pixels. In this event, the motion vector resolution is fixed to a ¼ pixel resolution and it is not necessary to encode the motion vector resolution flag. Further, a plurality of motion vectors may have either the same reference picture or different reference pictures.

As an alternative, when a plurality of motion vectors are used in the inter prediction of the current block, the plurality of motion vectors may have different resolutions, instead of having the same fixed resolution. For example, when motion vector 1 is (¼, 1) and motion vector 2 is (⅛, ¾), a motion compensation block at the position of (³/₁₆, ⅞) may be generated through the motion compensation as described above. In this event, motion vector 1 is fixed to a resolution in units of ¼ pixels and, accordingly, a motion vector resolution flag thereof is not encoded. In the case of motion vector 2, a motion vector resolution is adaptively encoded and a motion vector resolution flag indicating the resolution is encoded. Or, on the contrary, the resolution of motion vector 1 may be adaptively encoded while the resolution of motion vector 2 is fixed to a predetermined value. Otherwise, when two or more motion vectors are used in the inter prediction of the current block, an adaptively selected resolution may be used in encoding each of the motion vectors. Meanwhile, it is usual that the decoder performs inverse operations to the operations of an encoder. Further, in relation to determination of a motion vector resolution and use of a resolution flag, there is an agreement arranged in advance between the encoder and the decoder. In a case where there is a fixed motion vector resolution according to this agreement, when the decoder previously knows the fixed resolution and has the motion vector resolution flag transmitted from the encoder, the decoder decodes a motion vector by using the motion vector resolution flag.

Further, in the case of a P picture allowing a unidirectional simple prediction mode and a unidirectional complex prediction mode, the one embodiment is also applicable to use of the unidirectional complex prediction mode.

In addition, the one embodiment is applicable to an inter prediction mode allowing a bidirectional prediction mode using two reference pictures in a B picture. Further, it is natural that the one embodiment is also applicable to a unidirectional complex prediction mode in an inter prediction mode using one reference picture in the B picture.

The unidirectional simple prediction mode of a P picture is identical to the known prediction mode used for encoding and decoding of the P picture. That is, this corresponds to the inter prediction mode using one past reference picture and one motion vector. According to the one embodiment, the unidirectional complex prediction mode of the P picture is the inter prediction mode using one past reference picture and two motion vectors. The other operations are substantially the same as those of the bidirectional prediction mode of the B picture, except for the point that two motion compensation blocks are generated using one past reference picture. Further, it is possible to achieve the unidirectional complex prediction mode in the B picture also, and the unidirectional complex prediction mode of the B picture is identical to the unidirectional complex prediction mode in the P picture.

Figure 9:
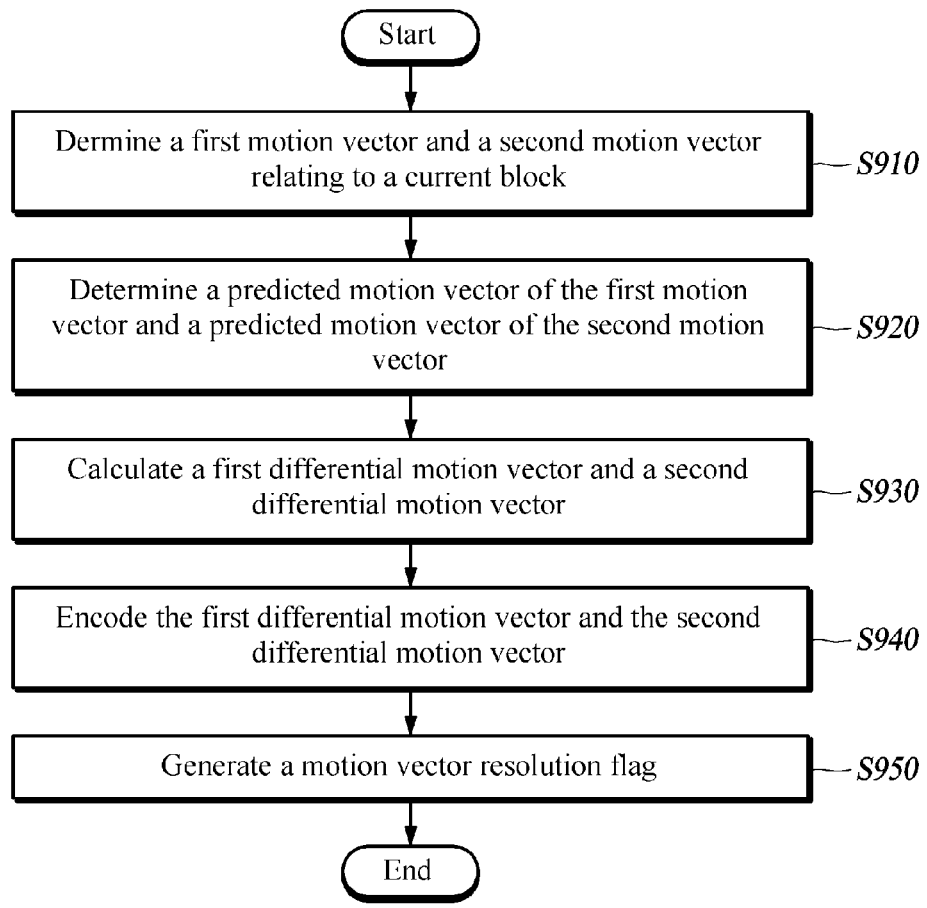
FIG. 9 is a flowchart of encoding a motion vector according to one embodiment of the present disclosure.

FIG. 9 is a flowchart of encoding a motion vector according to one embodiment of the present disclosure.

A motion vector encoding apparatus determines a first motion vector and a second motion vector of a current block to be encoded (S910). Herein, the first motion vector may have resolution which is different from that of the second predicted motion vector as mentioned earlier.

Meanwhile, the motion vector encoding apparatus determines a first predicted motion vector of the first motion vector and a second predicted motion vector of the second motion vector (S920). Herein, the predicted motion vectors may be determined by using motion vectors of the neighboring blocks adjacent to the current block.

Then, the motion vector encoding apparatus differentiates the first motion vector and the first predicted motion vector to calculate a first differential motion vector, and differentiates the second motion vector and the second predicted motion vector to calculate a second differential motion vector (S930). The motion vector encoding apparatus then encodes the first differential motion vector and second differential motion vector (S940).

Meanwhile, the motion vector encoding apparatus may carry out the encoding operation by selectively generating a motion vector resolution flag which indicates motion vector resolution(s) of the first motion vector and/or the second motion vector (S950). For example, when both of the motion vector resolutions of the first motion vector and second motion vector are fixed, the motion vector encoding apparatus may not generate the motion vector resolution flag. If the first motion vector has a fixed resolution and the second motion vector has a variable resolution, it is okay to generate and encode just one motion vector resolution flag which indicates the resolution of the second motion vector.

Figure 10:
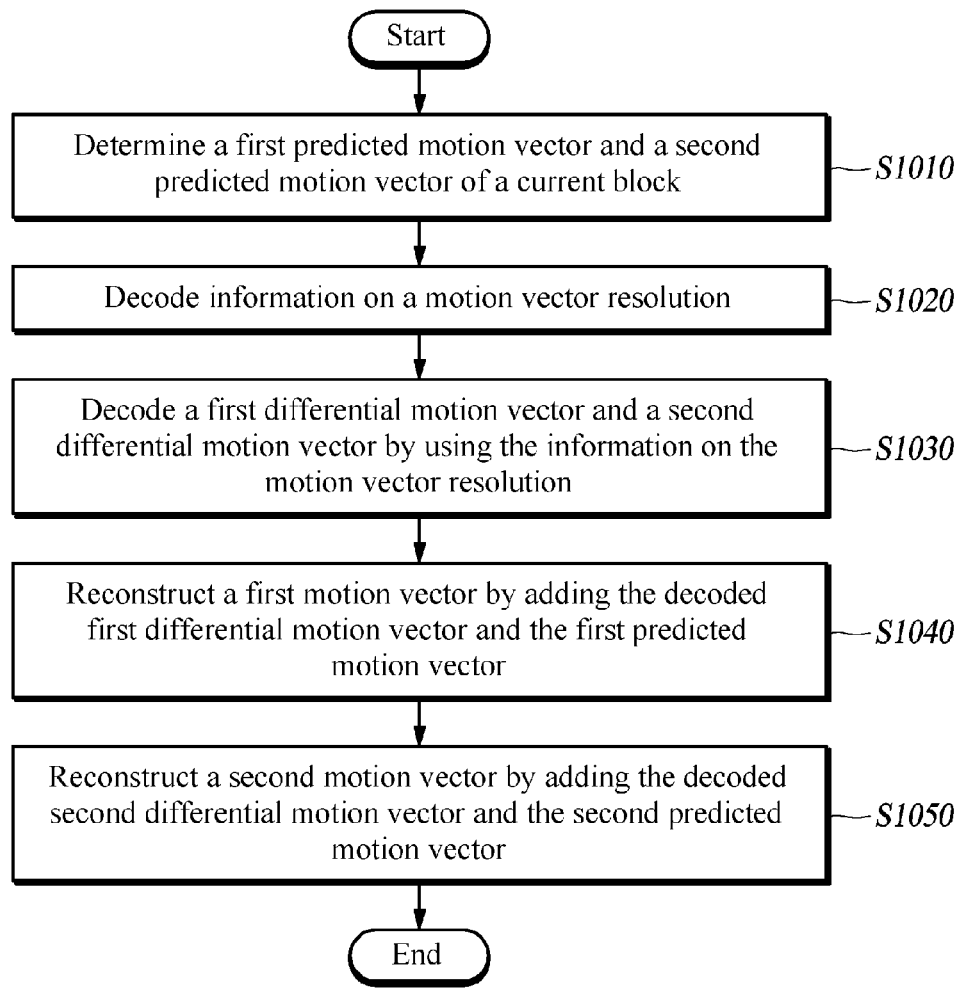
FIG. 10 is a flowchart of decoding a motion vector according to another embodiment and the one embodiment of the present disclosure.

Referring to FIG. 10, a method performed by a motion vector decoding apparatus for decoding a motion vector will now be described according to the aforementioned one embodiment of the present disclosure.

At first, the motion vector decoding apparatus determines a first predicted motion vector and a second predicted motion vector of a current block to be decoded (S1010). The first and second predicted motion vectors may be determined by using motion vectors of neighboring blocks adjacent to the current block.

In addition, decoding is performed on information on a motion vector resolution from a bitstream (S1020), followed by decoding a first differential motion vector and a second differential motion vector by using the information on the motion vector resolution (S1030). Herein, the motion vector resolution information may include a resolution flag which indicates motion vector resolution(s) of a first motion vector and/or a second motion vector.

For example, when both of the motion vector resolutions of the first motion vector and second motion vector are fixed as described earlier, the motion vector resolution flag may not be included in the decoded information on the motion vector resolution. Otherwise, when at least one of the motion vector resolutions of the first motion vector and second motion vector is variable, the motion vector resolution flag may be included in the decoded information on the motion vector resolution. For example, if when the first motion vector has a fixed resolution of ¼ and the second motion vector has resolution ⅛ which is different from the fixed resolution, the motion vector resolution information may include just the second motion vector resolution flag. These above described functions and features are performed by the motion vector encoding apparatus and the motion vector decoding apparatus sharing a fixed resolution, when the motion vector decoding apparatus can determine the motion vector resolution without needing a separate motion vector resolution flag. However, the present disclosure is not limited thereto. Regardless of whether the motion vector resolution is fixed or not, the motion vector encoder apparatus may transmit the motion vector resolution flag of the motion vector incorporated in the motion vector resolution information, and then the motion vector decoding apparatus may decode the motion vector resolution flag to decode a differential motion vector.

The motion vector decoding apparatus determines in step S1040 a first motion vector of the current block by adding the decoded first differential motion vector decoded in step S1030 and the first predicted motion vector determined in step S1010. In addition, the motion vector decoding apparatus determines in step S1050 a second motion vector by adding the decoded second differential motion vector decoded in step S1030 and the second predicted motion vector determined in step S1010. Thusly, the motion vector decoding apparatus performs motion compensation on the determined first motion vector and second motion vector to thereby generate a prediction block of the current block.

For example, the motion vector decoding apparatus may use the first motion vector and second motion vector to generate two respective motion compensated blocks of the current block, and it may calculate an average (or weighted average) of the two motion compensated blocks to generate the predicted block of the current block. Alternatively, the first motion vector and second motion vector may be interpolated to generate the ultimate current block motion vector which is then used to generate prediction block of the current block. For example, if steps S1040 and S1050 determine the first motion vector and second motion vector to be ($\frac{1}{4}$, 1) and ($\frac{1}{8}$, $\frac{3}{4}$) respectively, the motion vector decoding apparatus may perform a linear interpolation of the two motion vectors to generate a motion vector of ($\frac{3}{16}$, $\frac{7}{8}$), and it may use this linearly interpolated motion vector to generate the predicted block of the current block.

Another Embodiment

Now, an apparatus and a method for motion vector encoding/decoding according to another embodiment of the present disclosure will be described.

In the another embodiment, the inter prediction encoding includes a unidirectional simple prediction mode that uses one motion vector, and a unidirectional complex prediction mode and a bidirectional prediction mode, each of which uses two motion vectors. For each block or each predetermined area, an optimum prediction mode is determined and information indicating the determined prediction mode is encoded. Further, a B picture allows all of the unidirectional simple prediction mode, the unidirectional complex prediction mode, and the bidirectional prediction mode. In the case of a P picture, the unidirectional simple prediction mode and the unidirectional complex prediction mode are allowed. In the bidirectional prediction mode or the unidirectional complex prediction mode, one reference block is generated using a weighted average of two reference blocks obtained through motion compensation using two motion vectors. Alternatively, a real motion vector may be first obtained from an average of two motion vectors, and a reference block may be then generated by performing motion compensation using the real motion vector. For example, motion vectors ($\frac{1}{4}$, 1) and ($\frac{1}{8}$, $\frac{3}{4}$) are encoded, and a reference block is then generated by performing motion compensation using ($\frac{3}{16}$, $\frac{7}{8}$), which is calculated using the two motion vectors.

According to the another embodiment, a motion vector resolution can be determined for each prediction mode.

FIG. 1 is some embodiments of resolutions of motion vectors and transmission or non-transmission of resolution flags of motion vectors according to each inter prediction mode.

The embodiments illustrated in FIG. 1 include embodiments of motion vector resolutions including a $\frac{1}{4}$ pixel resolution and a $\frac{1}{8}$ pixel resolution usable in the unidirectional simple prediction mode, the unidirectional complex prediction mode, and the bidirectional prediction mode, and transmission or non-transmission of resolution flags in the cases of those motion vector resolutions.

Referring to FIG. 1, embodiments of the unidirectional simple prediction mode include: (1) an embodiment in which the motion vector resolution is fixed to a $\frac{1}{4}$ pixel and, accordingly, the resolution flag is not transmitted; and (2) an embodiment in which the motion vector resolution is selectable from a $\frac{1}{4}$ pixel and a $\frac{1}{8}$ pixel and the resolution flag is thus transmitted.

Referring to FIG. 1, embodiments of motion vector 1 and motion vector 2 of the unidirectional complex prediction mode and the bidirectional prediction mode include: (1) an embodiment in which the motion vector resolution of motion vector 1 is fixed to a $\frac{1}{4}$ pixel and, accordingly, the resolution flag of motion vector 1 is not transmitted, while the motion vector resolution of motion vector 2 is selectable from a $\frac{1}{4}$ pixel and a $\frac{1}{8}$ pixel and the resolution flag of motion vector 2 is thus transmitted; (2) an embodiment in which each of the motion vector resolutions of motion vector 1 and motion vector 2 is selectable from a $\frac{1}{4}$ pixel and a $\frac{1}{8}$ pixel and both of the resolution flags of motion vector 1 and motion vector 2 are thus transmitted; (3) an embodiment in which the motion vector resolution of motion vector 1 is selectable from a $\frac{1}{4}$ pixel and a $\frac{1}{8}$ pixel and the resolution flag of motion vector 1 is thus transmitted, while the motion vector resolution of motion vector 2 is fixed to a $\frac{1}{4}$ pixel and, accordingly, the resolution flag of motion vector 2 is not transmitted; and (4) an embodiment in which each of the motion vector resolutions of motion vector 1 and motion vector 2 is selectable from a $\frac{1}{4}$ pixel and a $\frac{1}{8}$ pixel and one resolution flag indicating the resolution of motion vector 1 or motion vector 2 is transmitted.

FIG. 2 is some embodiments of resolutions of motion vectors and transmission or non-transmission of resolution flags of motion vectors according to each inter prediction mode.

Referring to FIG. 2, embodiments of the unidirectional simple prediction mode include: (1) an embodiment in which the motion vector resolution is fixed to a $\frac{1}{2}$ pixel and, accordingly, the resolution flag is not transmitted; and (2) an embodiment in which the motion vector resolution is selectable from a $\frac{1}{2}$ pixel and a $\frac{1}{4}$ pixel and the resolution flag is thus transmitted.

Referring to FIG. 2, embodiments of motion vector 1 and motion vector 2 of the bidirectional prediction mode include: (1) an embodiment in which the resolution of motion vector 1 is fixed to a $\frac{1}{4}$ pixel and, accordingly, the resolution flag of motion vector 1 is not transmitted, while the motion vector resolution of motion vector 2 is selectable from a $\frac{1}{2}$ pixel and a $\frac{1}{8}$ pixel and the resolution flag of motion vector 2 is thus transmitted; (2) an embodiment in which the resolution of motion vector 1 is selectable from a $\frac{1}{2}$ pixel and a $\frac{1}{8}$ pixel and the resolution flag of motion vector 1 is thus transmitted and the resolution of motion vector 2 is selectable from a $\frac{1}{2}$ pixel and a $\frac{1}{4}$ pixel and the resolution flag of motion vector 2 is thus transmitted; (3) an embodiment in which the motion vector resolution of motion vector 1 is selectable from a $\frac{1}{2}$ pixel and a $\frac{1}{8}$ pixel and the resolution flag of motion vector 1 is thus transmitted, while the motion vector resolution of motion vector 2 is fixed to a ¼ pixel and, accordingly, the resolution flag of motion vector 2 is not transmitted; and (4) an embodiment in which each of the motion vector resolutions of motion vector 1 and motion vector 2 is selectable from a ¼ pixel and a ⅛ pixel and one resolution flag indicating the resolution of motion vector 1 or motion vector 2 is transmitted.

Meanwhile, according to one or more embodiments of the present disclosure, the motion vector resolution may be determined for each motion vector or each predetermined picture area, for example, in units of blocks, macro blocks, slices, pictures, or sequences, which correspond to units for encoding/decoding. For example, in inter prediction of blocks belonging to the first slice, the resolution of a motion vector in the unidirectional simple prediction mode is fixed to a ¼ pixel and, accordingly, the resolution flag of the motion vector is not transmitted, the resolution of motion vector 1 in the bidirectional prediction mode is fixed to a ¼ pixel and, accordingly, the resolution flag of motion vector 1 is not transmitted, and the resolution of motion vector 2 in the bidirectional prediction mode is selectable from a ¼ pixel and a ⅛ pixel and the resolution flag of motion vector 2 is thus transmitted to the decoder. In inter prediction of blocks belonging to the next slice, the resolution of a motion vector in the unidirectional simple prediction mode is fixed to a ½ pixel and, accordingly, the resolution flag of the motion vector is not transmitted, the resolution of motion vector 1 in the bidirectional prediction mode is fixed to a ¼ pixel and, accordingly, the resolution flag of motion vector 1 is not transmitted, and the resolution of motion vector 2 in the bidirectional prediction mode is selectable from a ½ pixel and a ⅛ pixel and the resolution flag of motion vector 2 is thus transmitted to the decoder.

Further, differently combined motion vector resolutions may be used for the P picture and the B picture. For example, all P pictures may be encoded and decoded using exemplary combined resolution 1 of FIG. 2 and all B pictures may be encoded and decoded using exemplary combined resolution 8 of FIG. 2.

Further, the another embodiment can be applied to both a P picture and a B picture. It is also possible to use different motion vector resolutions according to prediction modes used in the P picture and the B picture.

Yet Another Embodiment

Now, an apparatus and a method for motion vector encoding/decoding according to yet another embodiment of the present disclosure will be described.

According to one or more embodiments of the present disclosure, a motion vector may have various resolutions.

In the yet another embodiment, the inter prediction encoding includes a unidirectional simple prediction mode that uses one motion vector, and a unidirectional complex prediction mode and a bidirectional prediction mode, each of which uses two motion vectors. For example, the unidirectional simple prediction mode is used as the prediction mode in the case where the motion vector resolution is ¼, and an optimum mode among the unidirectional simple prediction mode, the unidirectional complex prediction mode, and the bidirectional prediction mode is determined as the prediction mode for encoding in the case where the motion vector resolution is a high resolution, for example, ⅛, higher than ¼. Therefore, an optimum motion vector resolution is determined for each block or each predetermined area and information indicating the determined motion vector resolution is encoded, and an optimum prediction mode is determined according to the motion vector resolution and information indicating the determined prediction mode is encoded. Further, a B picture allows all of the unidirectional simple prediction mode, the unidirectional complex prediction mode, and the bidirectional prediction mode. For example, when the motion vector resolution is ¼, the motion vector resolution flag is encoded into ¼ and the unidirectional simple prediction mode is the prediction mode, which is not encoded. When the motion vector resolution is a high resolution, for example, ⅛, higher than ¼, the motion vector resolution flag is encoded into ⅛, the optimum mode among the unidirectional simple prediction mode, the unidirectional complex prediction mode, and the bidirectional prediction mode is determined as the prediction mode, and the optimum mode is encoded.

In this event, the motion vector resolution and the inter prediction mode may be encoded using their syntaxes, respectively. For example, at the time of encoding them using their syntaxes, respectively, if the current optimum motion vector resolution is ⅛ and the optimum prediction mode is the unidirectional simple prediction mode, the motion vector resolution and the prediction mode of the current block are encoded. Since the motion vector resolution after it is decoded is ⅛, the decoder decodes the prediction mode into the unidirectional simple prediction mode.

FIG. 3 is an example of encoding and decoding a motion vector resolution and an inter prediction mode using one syntax in the case of P picture.

For example, the motion vector resolution and the inter prediction mode are encoded into "11" when the motion vector resolution is ⅛ and the prediction mode is the unidirectional complex prediction mode and into "10" when the motion vector resolution is ⅛ and the prediction mode is the unidirectional simple prediction mode. Further, when the motion vector resolution is ¼, the prediction mode is the unidirectional simple prediction mode and the motion vector resolution and the inter prediction mode are encoded into "0". When the unidirectional complex prediction mode has been selected, resolutions of motion vectors 1 and 2 may be selected from the combined unidirectional simple prediction mode/unidirectional complex prediction mode resolutions shown in FIG. 1.

In this event, in the case of encoding by CAVLC, bins of FIG. 3 are encoded as they are. In the case of encoding by CABAC, encoding may be performed with different probabilities according to the bins with reference to FIGS. 4 to 6.

FIG. 5 illustrates the probability conditions of bin 1, and FIG. 6 illustrates the probability conditions of bin 2.

For example, referring to FIG. 5, when the motion vector resolution of the current block is ⅛ and the prediction mode is the unidirectional simple prediction mode, the resolutions of neighboring blocks A and B are used for encoding of "1" corresponding to bin 1 of "10". When both of the two blocks are ¼, probability model 0 (Context 0) is used for the encoding. Referring to FIG. 6, the probability models are determined using the prediction modes of blocks A and B in encoding of "2" corresponding to bin 2 of "10". When neither of the two blocks is the unidirectional complex prediction mode, probability model 2 (Context 2) is used for the encoding.

FIG. 7 is an example of a method of encoding and decoding a motion vector resolution and an inter prediction mode using one syntax in the case of B picture.

For example, the motion vector resolution and the inter prediction mode are encoded into "111" when the motion vector resolution is ⅛ and the prediction mode is the bidirectional prediction mode, into "110" when the prediction mode is the unidirectional complex prediction mode, and into "10" when the prediction mode is the unidirectional simple prediction mode. Further, when the motion vector resolution is ¼, the prediction mode is the unidirectional simple prediction mode and the motion vector resolution and the inter prediction mode are encoded into "0". When the unidirectional complex prediction mode or the bidirectional prediction mode has been selected, resolutions of motion vectors 1 and 2 may be selected from the combined unidirectional simple prediction mode/unidirectional complex prediction mode resolutions shown in FIG. 1.

In this event, in the case of encoding by CAVLC, bins of FIG. 7 are encoded as they are. In the case of encoding by CABAC, encoding may be performed with different probabilities according to the bins with reference to FIGS. 4 to 6 and 8.

FIG. 8 is the probability conditions of bin 3.

Referring to FIG. 8, arithmetic encoding may be performed with different probability conditions according to the prediction modes of neighboring blocks. For example, both blocks A and B, which are neighboring blocks, are in the bidirectional prediction mode, probability model 0 (Context 0) is used for the encoding. When one of blocks A and B are in the bidirectional prediction mode, probability model 1 (Context 1) is used for the encoding. When neither of the two blocks is the bidirectional prediction mode, probability model 2 (Context 2) is used for the encoding.

Further, in the bidirectional prediction mode or the unidirectional complex prediction mode, one reference block is generated using a weighted average of two reference blocks obtained through motion compensation using two motion vectors. Or, a real motion vector may be first obtained from an average of two motion vectors, and a reference block may be then generated by performing motion compensation using the real motion vector. For example, motion vectors (¼, 1) and (⅛, ¾) are encoded, and a reference block is then generated by performing motion compensation using (³⁄₁₆, ⅞) calculated using the two motion vectors.

Meanwhile, it is usual that the decoder performs inverse operations to the operations of an encoder. In relation to determination of a prediction mode and use of mode information, and to determination of a motion vector resolution and use of a resolution flag, there is an agreement arranged in advance between the encoder and the decoder. According to this agreement, the decoder may first decode prediction mode information and then decode a motion vector resolution promised according to the prediction mode. For example, in a case where there is a fixed motion vector resolution, when a decoder previously knows the fixed resolution and has a motion vector resolution flag transmitted from an encoder, the decoder decodes a motion vector by using the motion vector resolution flag.

Methods for encoding/decoding a motion vector will now be described according to the another embodiment and the yet another embodiment of the present disclosure, referring to FIGS. 11 and 12.

Figure 11:
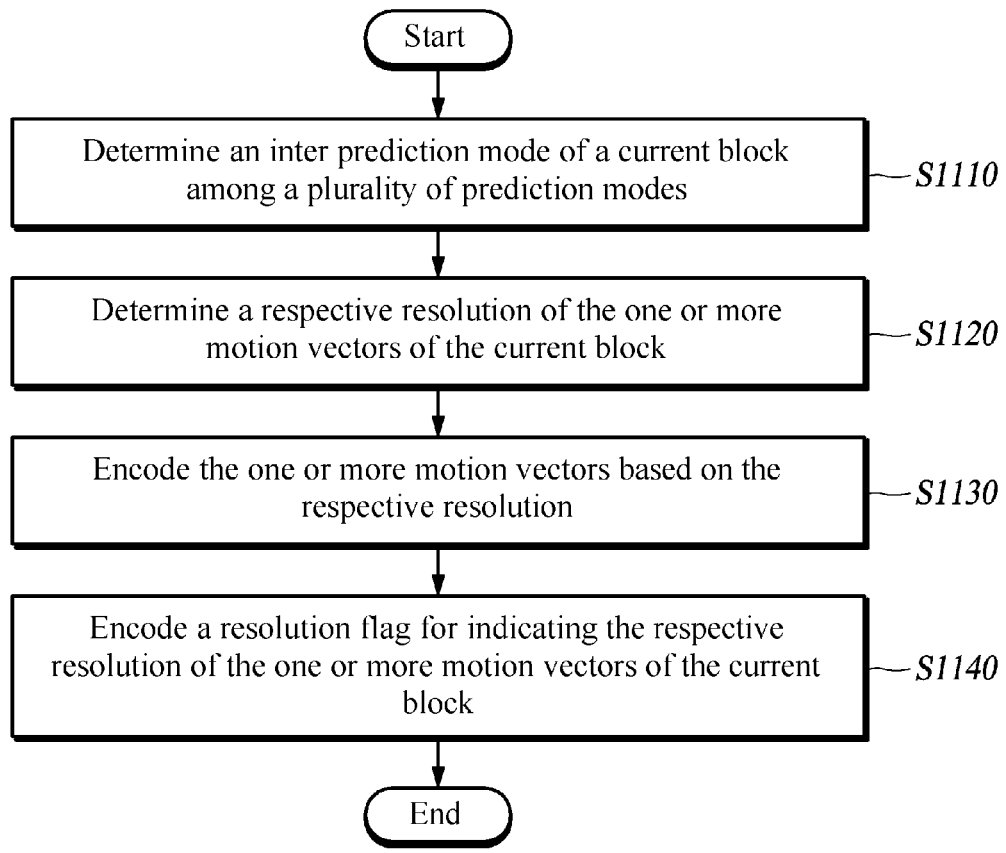
FIG. 11 is a flowchart of encoding a motion vector according to another embodiment and yet another embodiment of the present disclosure.

Referring to FIG. 11 on the methods performed by an motion vector encoding apparatus for encoding a motion vector according to the another and yet another embodiments, the motion vector encoding apparatus determines an inter prediction mode among a number of prediction modes of the current block (S1110). Herein, the number of prediction modes include a first prediction mode (unidirectional prediction mode) using a single motion vector and a second prediction mode using multiple motion vectors which include a unidirectional complex prediction mode and a bidirectional prediction mode.

The motion vector encoding apparatus determines motion vector resolution(s) of one or more motion vectors of the current block (S1120), and encodes the one or more motion vectors based on the determined motion vector resolution(s) (S1130). Herein, encoding the motion vectors may refer to encoding the current block motion vector itself but it should be understood to encompass encoding the difference between the current block motion vector and predicted motion vector.

Meanwhile, the encoding apparatus may encode in step S1140 a motion vector resolution flag which indicates the respective motion vector resolution(s) determined in step S1120. For example, if the motion vector resolution determined in step S1120 is a fixed resolution shared by the motion vector encoding apparatus and the motion vector decoding apparatus, the motion vector encoding apparatus may not encode the motion vector resolution flag. If the motion vector resolution determined in step S1120 is not a fixed for the motion vector, the motion vector encoding apparatus encodes the motion vector resolution flag which indicates the resolution of the motion vector. However, the present disclosure is not limited thereto. Regardless of whether the determined motion vector resolution is fixed or not, the encoder apparatus may encode the resolution flag of the motion vector.

Figure 12:
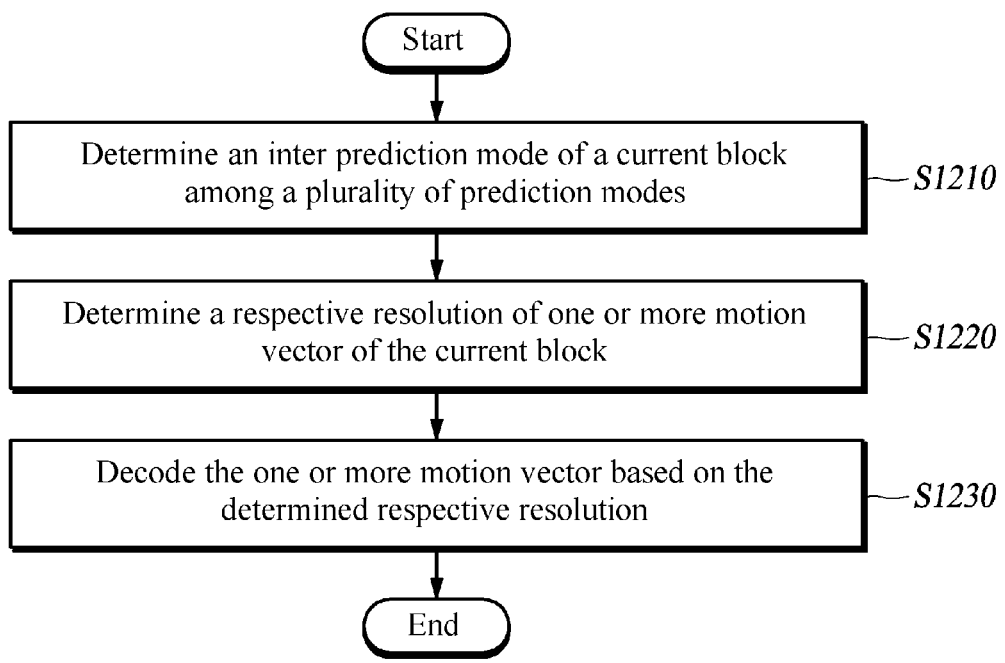
FIG. 12 is a flowchart of decoding a motion vector according to the another embodiment and yet another embodiment of the present disclosure.

Referring to FIG. 12 on the methods for decoding a motion vector according to the another and yet another embodiments, a motion vector decoding apparatus determines an inter prediction mode among a number of prediction modes of the current block (S1210). Herein, the number of prediction modes includes a first prediction mode using a single motion vector and a second prediction mode using multiple motion vectors.

The motion vector decoding apparatus determines respective motion vector resolution(s) of one or more motion vectors of the current block (S1220), and decodes the one or more motion vectors based on the determined motion vector resolution(s) (S1230).

Meanwhile, the decoding apparatus may decode from a bitstream a motion vector resolution flag which indicates the motion vector resolution(s) and determine the respective resolutions of the one or more motion vectors of the current block depending on the decoded motion vector resolution flag. For example, if the inter prediction mode determined in step S1210 is the second prediction mode, the decoding apparatus checks if a motion vector resolution flag on the first motion vector is absent in the bitstream and if positive, determines the resolution of the first motion vector to be fixed at ¼ pixel resolution. In addition, if there is a motion vector resolution flag in existence on the second motion vector, the decoding apparatus determines the flag representation of the resolution as the second motion vector resolution.

On the other hand, the motion vector resolutions may be determined depending on the inter prediction mode as determined in step S1210, as described by the another embodiment in FIGS. 1 and 2.

Alternatively in reverse, the inter prediction mode of the current block may be determined depending on the motion vector resolutions as determined in step S1220, as described by the yet another embodiment in FIGS. 3 to 8. For example, if the motion vector resolution is ¼, the inter prediction mode may be determined as the first prediction mode, while if the motion vector resolution is higher than ¼ to be, for example, ⅛, the inter prediction mode may be designated based on mode information extracted from the bitstream.

According to an aspect of the present disclosure as described above, a motion vector is encoded and an encoded motion vector is decoded by using an adaptively determined motion vector accuracy, so that it is possible to improve the compression efficiency of an image and the quality of a reconstructed image. The present disclosure can reduce the number of bits required for encoding of a differential motion vector. The present disclosure can improve the quality of a reconstructed image through motion compensation using a motion vector of a high accuracy and can improve the compression efficiency of an image by reducing the number of bits required for encoding of a residual signal of the image. The present disclosure can also reduce the number of bits required for encoding of information indicating the accuracy of a motion vector by efficiently encoding the information indicating the accuracy of the motion vector.

Some embodiments as described above may be implemented in the form of one or more program commands that can be read and executed by a variety of computer systems and be recorded in any non-transitory, computer-readable recording medium. The computer-readable recording medium may include a program command, a data file, a data structure, etc. alone or in combination. The program commands written to the medium are designed or configured especially for the one embodiment, or known to those skilled in computer software. Examples of the computer-readable recording medium include magnetic media such as a hard disk, a floppy disk, and a magnetic tape, optical media such as a CD-ROM and a DVD, magneto-optical media such as an optical disk, and a hardware device configured especially to store and execute a program, such as a ROM, a RAM, and a flash memory. Examples of a program command include a premium language code executable by a computer using an interpreter as well as a machine language code made by a compiler. The hardware device may be configured to operate as one or more software modules to implement one or more embodiments of the present disclosure. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

Although exemplary embodiments of the present disclosure have been described for illustrative purposes, those skilled in the art will appreciate that various modifications, additions and substitutions are possible, without departing from the various characteristics of the disclosure. That is, it is understood that the present disclosure should not be limited to these embodiments but various changes and modifications can be made by one ordinary skilled in the art within the subject matter, the spirit and scope of the present disclosure as hereinafter claimed. Specific terms used in this disclosure and drawings are used for illustrative purpose and not to be considered as limitations of the present disclosure. Exemplary embodiments of the present disclosure have been described for the sake of brevity and clarity. Accordingly, the scope of the claimed invention is not limited by the explicitly described above embodiments but by the claims and equivalents thereof.

The invention claimed is:

1. A method performed by a motion vector encoding apparatus for encoding a motion vector of a current block in a unidirectional complex prediction mode or a bidirectional prediction mode where a plurality of motion vectors are used, the method comprising:
   determining a first motion vector resolution for an image area in which the current block is located;
   determining a first motion vector of the current block, the first motion vector having the first motion vector resolution predetermined for the image area;
   determining a second motion vector of the current block, the second motion vector having a second motion vector resolution for the current block, the second motion vector resolution being variably selected among a plurality of motion vector resolutions;
   generating a predicted block of the current block by using both (i) the first motion vector in the first motion vector resolution predetermined for the image area and (ii) the second motion vector in the second motion vector resolution variably selected for the current block;
   determining a predicted motion vector of the first motion vector and a predicted motion vector of the second motion vector;
   calculating a first differential motion vector and a second differential motion vector, wherein the first differential motion vector corresponds to a difference between the first motion vector and the predicted motion vector of the first motion vector, and the second differential motion vector corresponds to a difference between the second motion vector and the predicted motion vector of the second motion vector;
   encoding the first differential motion vector and the second differential motion vector; and
   encoding a motion vector resolution flag for identifying, from the plurality of motion vector resolutions, the second motion vector resolution for the current block.

2. The method of claim 1, wherein the motion vector resolution flag is encoded in a unit of the current block.

3. A method performed by a motion vector decoding apparatus for decoding a motion vector of a current block to be decoded in a unidirectional complex prediction mode or a bidirectional prediction mode where a plurality of motion vectors are used, the method comprising:
   determining a first motion vector resolution for an image area in which the current block is located;
   determining a first predicted motion vector of a first motion vector of the current block and a second predicted motion vector of a second motion vector of the current block;
   decoding a motion vector resolution flag for the current block and selecting, from a plurality of motion vector resolutions, a second motion vector resolution of the second motion vector based on the motion vector resolution flag;
   decoding a first differential motion vector and a second differential motion vector, the first differential motion vector being decoded by using the first motion vector resolution predetermined for the image area and the second differential motion vector being decoded by using the second motion vector resolution variably selected for the current block based on the motion vector resolution flag;
   reconstructing the first motion vector by adding the decoded first differential motion vector and the first predicted motion vector;

reconstructing the second motion vector by adding the decoded second differential motion vector and the second predicted motion vector; and generating a predicted block of the current block by using the first motion vector and the second motion vector.

4. The method of claim 3, wherein the motion vector resolution flag is decoded in a unit of the current block.

5. The method of claim 3, further comprising:

deriving a motion vector for the current block by calculating an average of the first motion vector and the second motion vector.

6. The method of claim 3, further comprising:

deriving a first motion-compensated block by using the first motion vector; and deriving a second motion-compensated block by using the second motion vector, wherein the predicted block of the current block is generated by using the first motion-compensated block and the second motion-compensated block.

* * * * *